July 22, 1952 — R. D. SHAW — 2,604,245
RING PLACING MEANS
Filed Sept. 1, 1945 — 2 SHEETS—SHEET 1

Inventor
Robert D. Shaw
By Joseph K. Schofield
Attorney

July 22, 1952   R. D. SHAW   2,604,245
RING PLACING MEANS
Filed Sept. 1, 1945   2 SHEETS—SHEET 2
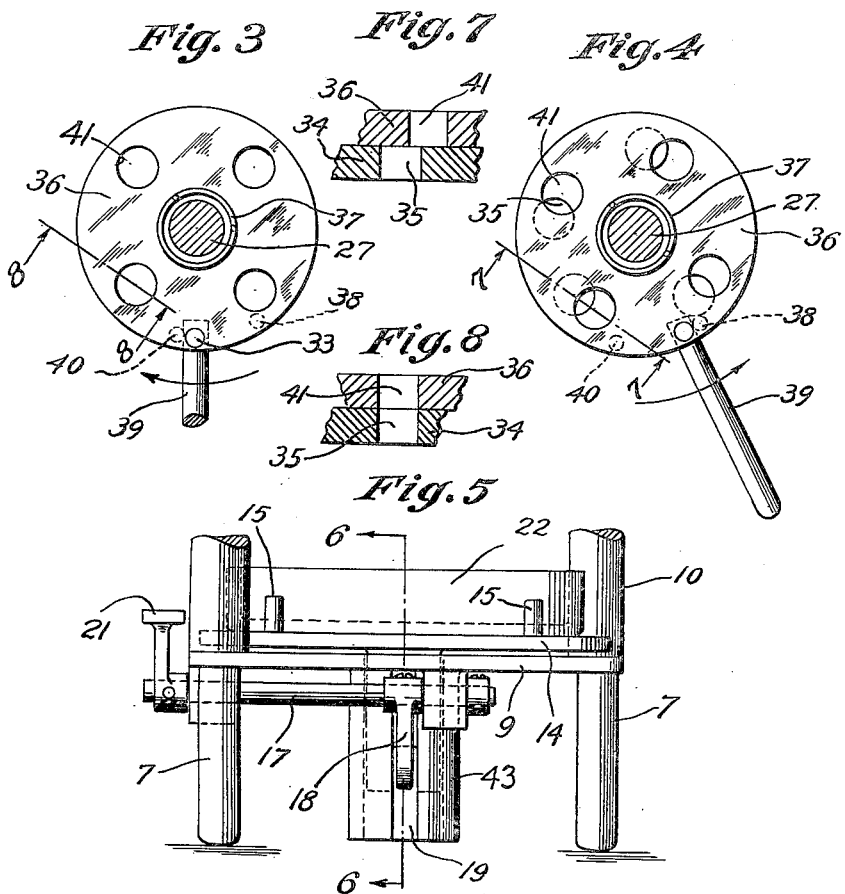
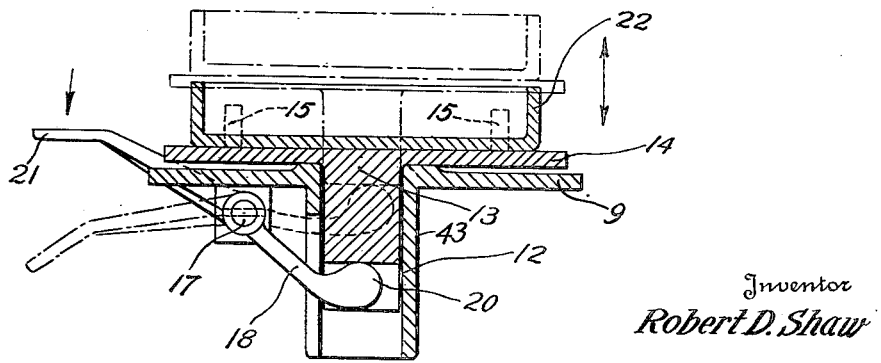
Inventor
Robert D. Shaw
By Joseph K. Schofield
Attorney Patented July 22, 1952

2,604,245

UNITED STATES PATENT OFFICE 2,604,245

RING PLACING MEANS

Robert D. Shaw, Bloomfield, Conn.

Application September 1, 1945, Serial No. 614,077

3 Claims. (Cl. 226—2)

This invention relates to a novel placing device applicable to scientific laboratory work to place test rings, cylinders, or other articles or materials on surfaces coated with culture impregnated agar or other material.

More specifically the invention relates to means for placing small metallic articles in accurately spaced positions on colloidal surfaces in a Petri dish or plate.

In laboratory work it is frequently required to make a large number of comparative tests of biological or bacteriological cultures. A case in point is the quantitative potency testing of samples of penicillin, and the invention will be described with this as an illustration.

The usual laboratory practice in these tests is to form a thin layer of agar or other media in a Petri dish and develop a culture on the surface of the agar. This culture is of a typical bacteria type. The one generally used is that of Staphylococcus aurum. The potency of solutions of penicillin or the like may be determined by the extent to which a colony of culture is consumed in a given time under standard conditions by a measured quantity of the material under test. Ordinarily a measured quantity of the penicillin is placed upon a uniform culture or colony of bacteria and the dish incubated overnight under standard test conditions. The plate will then be found to have an area around the deposit cleared to a diameter commensurate with the concentration or potency of the solution used in the test.

For the usual potency tests four rings are sufficient but some may require six or more rings. I preferably so form the top plate 24, the fixed upper frame member 29 and the discharge plate 34 and the movable or oscillating member 36 of the placing device to accommodate four or six rings. These members will each be referred to more in detail as the description proceeds.

In order to standardize the conditions of test small sterile rings of equal size are set at spaced positions on the surface of the agar or other test media and the test sample is placed within the rings by means of a suitable dropper. The sample then flows beneath the rings into and outwardly through the culture impregnated agar. Care is required to position these rings at proper distances from each other and so that they will rest firmly in the surface of the agar. All of this must be done without impairing the sterile conditions of the rings or contaminating the agar.

The present invention provides means by which any desired number of these metal articles may be simultaneously placed in spaced relationship on the surface of the agar mechanically and without contamination and with a minimum of effort.

A further object of my invention is to make uniform the degree of penetration in the agar of the metal articles so that they will stand firmly in position on the surface of the culture media and maintain uniform conditions for the simultaneous tests of different specimens being carried out on one plate.

Substantially the same device as the one selected for illustration may be used to drop definite quantities of substances which are desired to be separately positioned on a plate or other member.

And finally it is an object of the invention to removably position a plate, dish or other member to receive the articles or quantities of substances.

Other objects of my invention will be apparent from the following description of a preferred embodiment of the invention illustrated in the attached drawings in which:

Fig. 3 is a horizontal cross section of the placing device taken on the line 3—3 of Fig. 2;

Fig. 4 is a similar horizontal cross section showing the discharge device in a different position;

Fig. 5 is a side elevation of the operating means for the receiving member for the articles or substance dropped by the device;

Fig. 6 is a vertical cross section taken on the line 6—6 of Fig. 5; and

Figs. 7 and 8 are detail views showing relative movement of the dropping device.

Figure 1:
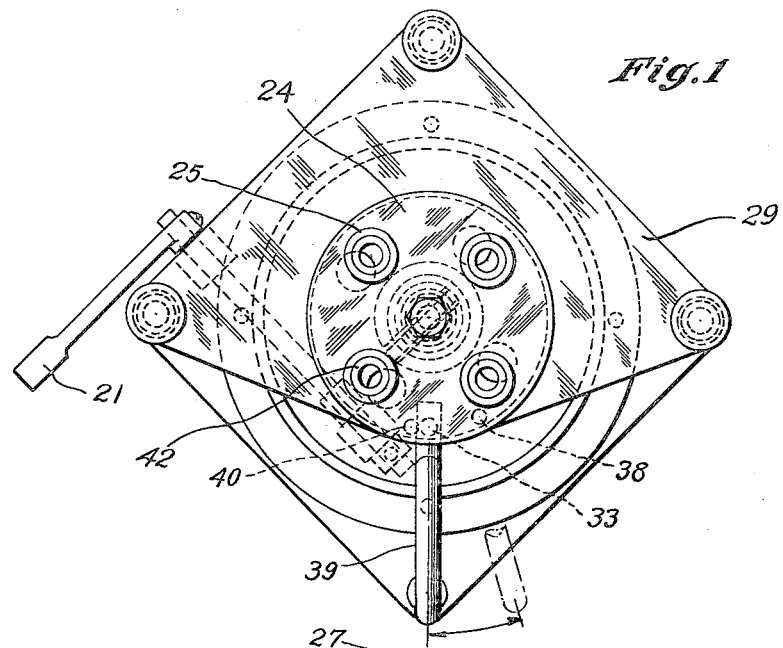
Figure 1 is a plan view of an embodiment of the invention showing ring placing means.

In the embodiment of the invention illustrated in the drawings, I have shown the placing or dropping means adapted to place four equally spaced metallic members on the surface of the agar in a dish positioned below the dropping means.

The device consists of pedestals or legs 7 arranged vertically in a square and upon which the operating parts are mounted. A lower frame member or plate 9 of generally square form has holes in its corners from which the pedestals 7 depend. Pedestals 7 support the plate or lower frame member 9 in elevated position, and above the lower frame member, supported by extensions 11 of the pedestals 7 and by sleeves 10, is mounted the fixed upper frame member 29 as shown in Figs. 1 and 2.

Extending below the lower frame member 9 is a central hollow hub 43 in which is formed a cylindrical bearing 12 through which a plunger 13 may reciprocate vertically. The plunger 13 supports a circular tray 14 slightly larger than the diameter of a Petri dish. A series of three or more spaced pins 15 form positioning means to ensure proper locating of the Petri dish 22 centrally on the tray 14 and support it against lateral movement during the rise and fall of the tray 14.

Figure 2:
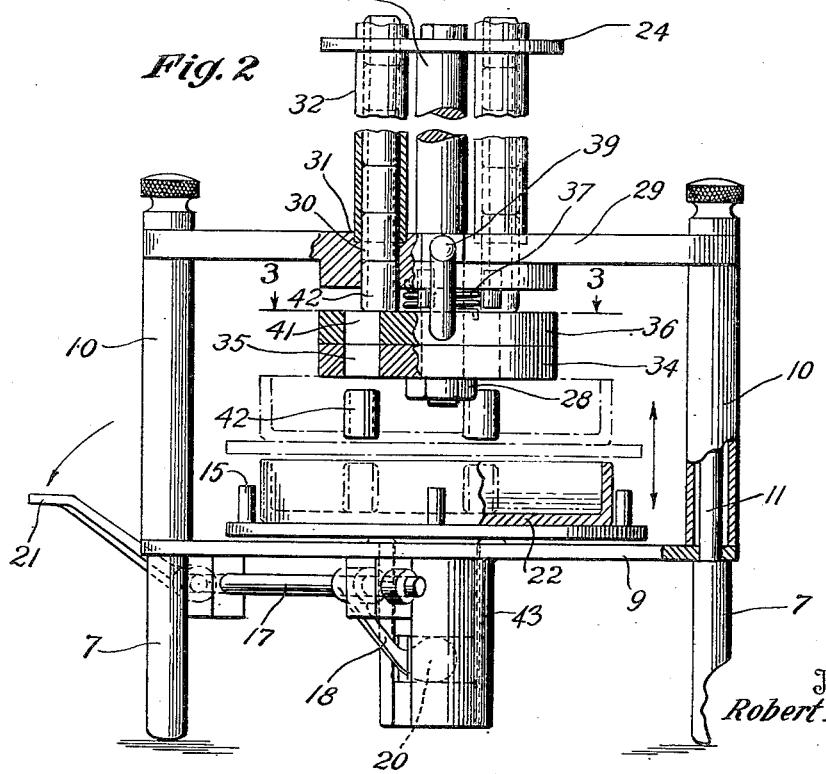
Fig. 2 is a front elevation of the same, partly in section.

Beneath the frame member or plate 9 as shown in Fig. 2 bearings are formed for a rock shaft 17. The inner portion of this rock shaft carries an arm 18 fixed to the shaft 17 the end of which projects through a slot 19 in the sleeve bearing 12 and forms a cam surface 20 bearing against the lower slotted end of the plunger 13. The outer end of the rock shaft 17 is equipped with a hand lever 21. In this way downward pressure by the finger on lever 21 serves to lift the tray 14 and the Petri dish 22. The tray and the dish drop back into the position shown in Fig. 2 by gravity when lever 21 is released. The length of the slot 19 in the sleeve bearing 12 is such that the extent of rise of the Petri dish 22 is limited and the desired drop of the rings onto the prepared surface of the dish is accomplished. In this way a suitable definite but very slight penetration of the rings or other articles being dropped into the surface of the agar is effected. By means of the transverse slotted end of the plunger 13 into which the cam end 20 of lever 18 fits the tray 14 is maintained against rotary movement.

The upper frame member 29 has a cover plate 24 spaced directly above it with a suitable number of holes 25 spaced uniformly around the center as shown in Fig. 1. The center of the top plate 24 is fixed to the upper frame member 29 by any preferred means such as a nut on the screw threaded upper end of the standard 27 which projects through the central hole in the plate 24. The threaded extended lower end of standard 27 supports the oscillating member 36 and the discharge plate 34 in alignment and a nut 28 on the lower end of standard 27 prevents their removal. The standard 27 may be pressed firmly into the hole in upper frame member 29 through which it passes and the discharge plate 34 may be pressed firmly on to the lower end of the standard 27 to prevent its rotation. The oscillating plate 36 is mounted for free rotation on the standard 27 immediately above discharge plate 34.

The upper frame member 29 has a series of holes 30 corresponding in position and in size somewhat smaller than the holes 25 in the top plate 24. The holes 30 are countersunk as shown at 31 in Fig. 2 to provide annular ledges. Tubes 32 ordinarily of glass are provided to slide readily through the holes 25 in plate 24 with the lower ends resting on the ledges 31. These tubes may be made of thin metal or other suitable material, it being important only that they be sufficiently durable and accommodate themselves to the handling of the material or articles dropped onto the dish or plate 22. They also must stand changes in temperature during sterilization.

The lower end of the standard 27 has a discharge plate 34 (Fig. 2). This discharge plate is fixed in position against rotation on the standard 27 and has a series of holes 35 similar in size to the holes in upper frame member 29 but angularly offset therefrom.

An oscillating member 36 is journalled on the lower portion of the standard 27 just below the upper frame member and may rest upon the discharge plate 34. A coil spring 37 is anchored in the upper surface of the oscillating member 36 and its other end is anchored in the bottom of the upper frame member 29 as shown in the sectional part of Fig. 2. The tension of coil spring is such that it rotates member 36 counter-clockwise in Fig. 4 so that holes 41 and 35 are normally in alignment as seen in Figs. 1, 3 and 8. The extent of oscillation is limited by means of angularly spaced studs or pins 38 and 40. Stud 38 depending from the upper frame member 29 comes in contact with stud 33 on the oscillating member 36 and limits the counter-clockwise movement of the member 36. A shaft lever or bar 39 is provided to oscillate the member 36 to the left in Fig. 2. The extent of movement in this direction is controlled by stud 40 depending from the upper frame member 29.

The member 36 has a circular series of holes 41 of the same diameter as those in the upper frame member 29 and discharge plate 34. The holes 41 are so positioned that they register normally with the holes 35 in the lower or discharge plate when the oscillating member 36 is held by the spring 37. The holes register below the holes 30 in the upper frame member 29 when the slide 36 is manually shifted to the right to its extreme position.

The rings 42 illustrating the invention are short sections of tubes generally of aluminum, stainless steel or other metal. These rings are of suitable height or length for the purpose of the experiment and the proportions of the ring placing means are determined accordingly. Thus the oscillating member 36 preferably has a thickness substantially less than the length of one of these rings 42 so that there will be a slight protuberance of the ring 42 above the upper surface of member 36. The member or material being dropped will then enter the hole in member 36 for transferring it to the lower or discharge plate 34 and this ring or the dropped material will fill the opening in the oscillating member 36 so that it will prevent the succeeding ring or other articles or material in the stack from falling below the surface of the member 36 or otherwise interfering with its oscillation. By the provision of a certain amount of clearance above member 36 room is provided for the studs 38 and 40, the spring 37 and for the cylinders, rings or other members 42 being dropped to be free from the upper frame member 29.

It has been found that a certain definite drop by gravity is necessary to cause the released ring to sink firmly into the upper surface of the film coated Petri dish. For this purpose the length of the rise of the tray 14 is predetermined to provide for the desired drop of the ring from its position within the member 36. This is indicated in dotted lines in Fig. 2.

The operation of the ring placing means will be apparent. The rings are stacked in the tubes 32. The tubes and rings are then properly sterilized and cooled. When it is desired to position the rings upon a series of Petri plates, the tubes 32 with their stacks of rings 42 are set vertically with their lower ends extending into the counter-bored holes in upper frame member 29.

It is to be pointed out that prior to dropping the rings 42 into the holes in member 36 it is necessary to place a Petri dish in position to receive the rings about to be discharged. For this purpose a previously prepared Petri dish with the bacteriological colony on the surface of the agar is grasped by the operator. The loose porcelain cover normally on the dish is removed. The dish is then placed upon the tray 14 and positioned by the pins 15. The lever 21 is then depressed and the tray and dish lifted to the position shown in dotted lines in Fig. 2.

At this moment the lever 39 must be shifted first clockwise as seen in Fig. 4 against the tension of spring 37 and then released to discharge a set of rings 42. When the lever 39 is moved clockwise as seen in Fig. 4 against the tension of spring 37 the holes 41 in the oscillating member 36 will be aligned with the tubes 32 so that the rings 42 can drop to position rings 42 in each hole 41 in the oscillating member 36. Counter clockwise movement of oscillating member 36 by the pressure of spring 37 will align the holes 41 in oscillating member 36 with holes 35 in the discharge plate 34. In this position of the oscillating member 36 the rings 42 can drop through the member 36 and the discharge plate 34 onto the prepared surface of the Petri dish 22.

The lever 21 is then released, which drops the tray 14 into position where the operator may remove the Petri dish 22. The dish is then in condition to receive the measured quantities of penicillin or like solutions which are under test.

It is understood that the novel features can be applied in placing rings or other articles or substances on dishes of other forms and sizes. Considerable variation is possible in minor details, proportions and materials without departing from the scope of the invention as defined in the following claims.

I claim:

1. A device for positioning material on the surface of a member, comprising vertically disposed tubes for the material to be positioned, an upper frame member and a discharge plate on said device having vertically disposed spaced openings therein angularly offset from each other, supporting means on the upper frame member for said tubes, an intermediate oscillating member having spaced holes therein supported on said device concentric with said upper and lower plates, said member being movable about a central vertical axis from a first position in which its holes are aligned with the openings in the upper frame member to a second position in which its holes are aligned with the openings in the discharge plate, whereby material dropping into the holes of said intermediate member from said upper frame member will drop from the discharge plate when said intermediate oscillating member is moved to its second position, and a dish supported on said device and removably positioned below said discharge plate to receive said material from said spaced openings in spaced positions determined by the spacing of the holes in the discharge plate.

2. Means for depositing articles from vertically disposed tubes on to a horizontal surface in spaced positions, comprising in combination, an upper frame member supporting said tubes, a central standard depending from the upper frame member, a discharge plate fixedly mounted on the standard below and spaced from said upper frame member, said member and plate having a plurality of vertical spaced holes, the holes of the upper frame member being angularly offset from those in the discharge plate, a top plate above the frame member and having a plurality of vertical holes aligned with those in the upper frame member, each pair of related holes in the top plate and upper frame member being adapted to removably receive and support a tube containing a plurality of articles, a member journalled on the standard intermediate the upper frame member and discharge plate for oscillatory movement about a central vertical axis, said oscillating member having a plurality of spaced vertical holes, a spring active on said oscillatory member and holding said member normally with its holes in registry with those in the discharge plate, and means for moving the oscillatory member to bring its holes into registry with the holes in the upper frame member.

3. Means for depositing articles from vertically disposed tubes on to a horizontal surface in spaced positions comprising in combination, an upper frame member, a central standard supported by and depending from the upper frame member, a discharge plate fixedly mounted on the standard and spaced from said upper frame member, said member and plate having a plurality of spaced vertical holes, the holes of one being angularly offset from those in the other, tubes supported on said upper frame member and each containing a plurality of articles, a top plate supported on said standard above said upper frame member and having a plurality of vertical holes aligned with those in the upper frame member, each pair of aligned holes in the top plate and upper frame member being adapted to removably receive and support a tube containing a plurality of articles, an oscillating member journalled on the standard intermediate the upper frame member and discharge plate for movement about a central vertical axis, said oscillating member having a plurality of vertical holes, first and second stops on said upper frame member, a detent on the oscillating member, a spring acting on the oscillating member and holding the latter against said first stop with its holes in registry with those in the discharge plate, and means for moving the oscillating member to engage its detent with said second stop with the holes in the oscillating member in registry with the holes in the upper frame member, whereby by releasing the oscillating member the oscillating member will return to its position to align its holes with those in the discharge plate and permit articles from said tubes to drop on to a surface below said plate.

ROBERT D. SHAW.

REFERENCES CITED

The following references are of record in the file of this patent:

UNITED STATES PATENTS

| Number | Name | Date |
| --- | --- | --- |
| 743,686 | Buehne | Nov. 10, 1903 |
| 1,383,623 | Groves | July 5, 1921 |
| 1,703,083 | Abbott | Feb. 26, 1929 |
| 1,904,756 | Wooster | Apr. 18, 1933 |
| 2,308,188 | Madden | Jan. 12, 1943 |
| 2,339,115 | Scherer | Jan. 11, 1944 |